United States Patent [19]
Müting

[11] 4,301,336
[45] Nov. 17, 1981

[54] HYBRID CIRCUIT

[75] Inventor: Frank Müting, Berlin, Fed. Rep. of Germany

[73] Assignee: Deutsche Telephonwerke und Kabelindustrie Aktiengesellschaft, Berlin, Fed. Rep. of Germany

[21] Appl. No.: 30,170

[22] Filed: Apr. 16, 1979

Related U.S. Application Data

[63] Continuation of Ser. No. 770,376, Feb. 22, 1977, abandoned.

[30] Foreign Application Priority Data

Feb. 20, 1976 [DE] Fed. Rep. of Germany ....... 2607480

[51] Int. Cl.³ .............................................. H04B 1/58
[52] U.S. Cl. ............................................. 179/170 NC
[58] Field of Search ......... 179/170 R, 170 T, 170 NC

[56] References Cited

U.S. PATENT DOCUMENTS

| | | | |
|---|---|---|---|
| 3,530,260 | 9/1970 | Gaunt, Jr. ..................... | 179/170 NC |
| 3,835,259 | 9/1974 | Medill et al. ................. | 179/170 NC |
| 3,855,430 | 12/1974 | Colardelle et al. ........... | 179/170 NC |
| 3,882,276 | 5/1975 | Feiner et al. .................. | 179/170 NC |
| 3,934,099 | 1/1976 | Elder, Jr. ...................... | 179/170 NC |
| 4,034,166 | 7/1977 | Hollis ............................ | 179/170 NC |
| 4,192,978 | 3/1980 | Vincent ........................ | 179/170 NC |
| 4,203,005 | 5/1980 | Fukuda et al. ................. | 179/1 CN |

FOREIGN PATENT DOCUMENTS

| | | | |
|---|---|---|---|
| 2019395 | 11/1971 | Fed. Rep. of Germany ...... | 179/170 NC |
| 2237547 | 2/1974 | Fed. Rep. of Germany ...... | 179/170 NC |
| 2914945 | 10/1979 | Fed. Rep. of Germany ...... | 179/170 NC |

OTHER PUBLICATIONS

L. N. Jackson, "A Thick Film Electronic Hybrid Coil", Proceedings of I.R.E.E., Australia, vol. 36, No. 5, May 1975, pp. 117-118.

Primary Examiner—John H. Wolff
Assistant Examiner—Randall P. Myers
Attorney, Agent, or Firm—Herbert L. Lerner

[57] ABSTRACT

Hybrid circuit for transition between two-wire and four-wire lines includes first and second operational amplifiers each having an inverted and non-inverted input and output, a voltage divider connected to each of the inverted inputs, a bidirectional terminal connecting the two-wire side to the non-inverted input of the first amplifier and a transmit terminal connecting the four-wire side to the non-inverted input of the second amplifier, to feed audio voltage to the non-inverted inputs, the voltage dividers having equal resistances, a receive terminal for connecting the four-wire side to the output of the first amplifier, matching impedances connected to the non-inverted input of the second amplifier and the output of the first amplifier, the matching impedances and an impedance balancing the impedance of the two-wire side compared to input impedances to the hybrid circuit being such that, for an incoming transmission, half of the output voltage of the second amplifier is at the non-inverted input of the first amplifier and, for an outgoing transmission, twice the input voltage to the first amplifier is at the output thereof, so that transmission loss in the hybrid circuit is zero in both directions, one of the amplifiers being operable for effecting phase reversal of an a-c voltage fed to the hybrid circuit from the four-wire side forming an asymmetric hybrid circuit; and a symmetric hybrid circuit including two of the asymmetric hybrid circuits.

3 Claims, 4 Drawing Figures 4,301,336

HYBRID CIRCUIT

This is a continuation, of application Ser. No. 770,376, filed 2/22/77 now abandoned.

The invention relates to a hybrid circuit for a transition from two-wire to four-wire lines and vice versa which is assembled from monolithic integrated differential amplifiers, preferably for electronic telecommunications and in particular, telephone exchanges controlled in accordance with a time multiplex method.

Hybrid circuits for the transition from two-wire to four-wire operation and vice versa have become known heretofore. They serve, for example, for dividing a two-way voice circuit in office transmissions and inter-switchboard connections into two directional voice circuits. Heretoforeknown inductive hybrid circuits have a disadvantage in that they have too much mass and require too much space to be mounted on circuit boards for use in electronic tele-communications system controlled in accordance with a time multiplex method such as a pulse amplitude modulation (PAM) system, for example.

It is an object of the invention to provide an electronic hybrid circuit, the components of which are combinable in an integrated circuit and which, in two-voice circuit directions, has no transmission loss or a fixed transmission loss in a given direction as well as high isolation between the incoming and the outgoing four-wire line.

With the foregoing and other objects in view, there is provided, in accordance with the invention, a hybrid circuit for a transition between two-wire and four-wire lines comprising an assembly of two monolithic integrated differential amplifiers serving as operational amplifiers, each having an inverted input and a non-inverted input, a preceding voltage divider connected to each of the inverted inputs, means for feeding audio voltage to each of the non-inverted inputs, the voltage dividers, respectively, having resistances of equal value to avoid a voltage gain, matching impedances operatively associated with a respective input and output of the four-wire side, the matching impedances and a balancing impedance of the characteristic impedance of the two-wire side with respect to given input impedances to the hybrid circuit being of such size that transmission loss in the hybrid circuit is zero in both directions, one of the amplifiers being operable for effecting phase reversal of an a-c voltage fed to the hybrid circuit from the four-wire side so as to obtain a high isolation or attenuation for the hybrid circuit, whereby an asymmetric hybrid circuit is formed.

In accordance with another feature of the invention, a symmetrical hybrid circuit with symmetrical four-wire inputs is formed of two configurations of the asymmetrical circuits connected together but having matching and balancing impedances with impedance values that are, respectively, one-half the impedance value of the corresponding impedances of an asymmetrical hybrid circuit.

In accordance with a further feature of the invention, the inverted input of one of the amplifiers is directly connected to an output thereof so that a given attenuation of an audio voltage transmitted from the four-wire to the two-wire side is obtained.

Other features which are cosidered as characteristic for the invention are set forth in the appended claims.

Although the invention is illustrated and described herein as embodied in a hybrid circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

In all of the figures, like components are identified by the same reference symbols.

Figure 1:
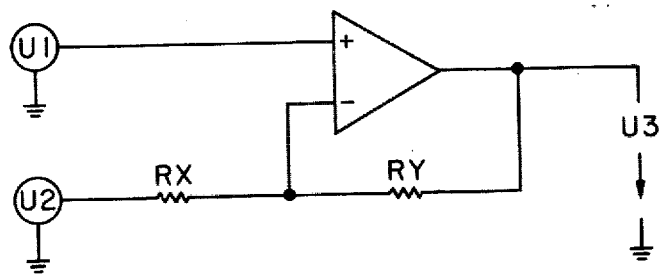
FIG. 1 is a circuit diagram of a voltage amplifier.

Referring now to the drawing and first, particularly, to FIG. 1 thereof, there is shown a conventional voltage amplifier formed of a monolithic integrated differential amplifier (operational amplifier) and two resistors RX and RY as a negative feedback network between the output of the operational amplifier, the inverted input thereof and a voltage source U2. If the values for the resistances RX and RY are chosen equal, a voltage gain of 2 for the input voltage U1 is obtained, so that the output voltage $U3 = 2\ U1$. The voltage U2 fed to the inverted input, on the other hand, is not amplified, but is subjected to a phase shift of 180°. In this case, the output voltage $U3 = U2$.

Figure 2:
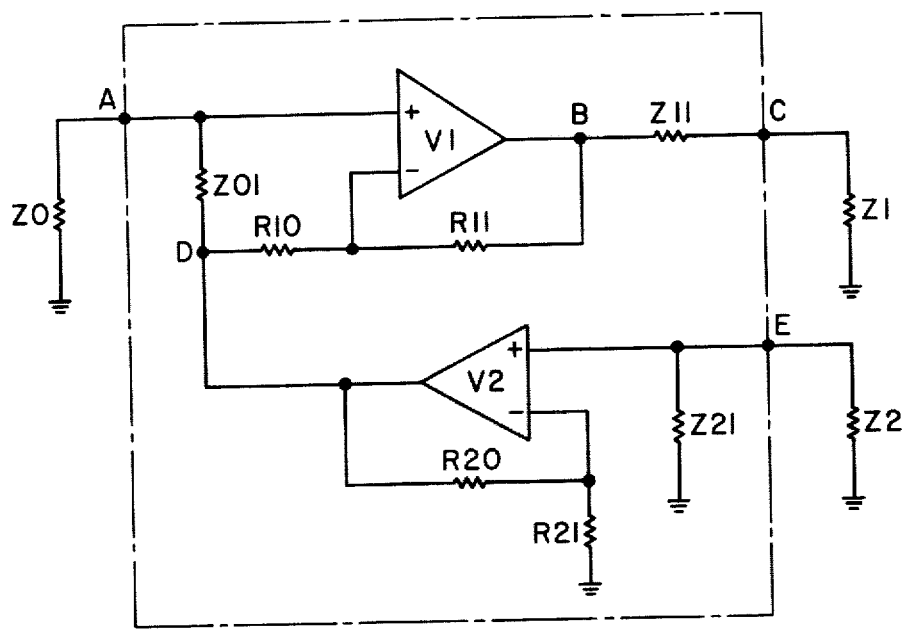
FIG. 2 is a circuit diagram of an asymmetrical hybrid circuit constructed in accordance with the invention.

The properties of the hereinaforedescribed voltage amplifier for shown in FIG. 1 are utilized, in accordance with the invention, constructing an asymmetrical hybrid circuit such as is shown in FIG. 2. The two-wire side is characterized by a characteristic impedance Z0, and the four-wire side by input impedances Z1 and Z2, which are connected to the outgoing line (Point C) and the incoming line (Point E) respectively. Matching impedances Z11 and Z21 are associated with the four-wire side in the hybrid circuit.

A balancing impedance Z01 for the characteristic impedance of the two-wire side, together with the characteristic impedance Z0 effects a voltage division of the audio-voltage which is present at the point E and is doubly amplified by the second operational amplifier V2. The resistance values of the resistors R20 and R21 connected to the inverted input of the second operational amplifier V2 are equal. The impedances Z0 and Z01 are of such size that one-half the output voltage of the second operational amplifier V2 is present at Point A. The transmission loss for the incomingly directed four-wire line to the two-wire side is thereby zero decibels.

For the outgoingly directed line branch from the two-wire side, a halving of the voltage at Point C is produced due to the double or two-fold amplification of the a-c voltage present at Point A through the first operational amplifier V1, and the following division of the voltage by the matching impedance Z11 and the input impedance Z1. The resistance values of the resistors R10 and R11, which are connected to the inverted input of the first operational amplifier V1, are likewise equal. Thus, the transmission loss for this line branch is also zero decibels.

The hybrid circuit isolation of the arrangement is to be as high as possible i.e. attenuation values of more than fifty decibels are to be attained between Points C and E. According to the invention, high hybrid circuit isolation (cross-talk attenuation) is obtained by the provision that at Point D, twice the audio voltage with a simultaneous phase shift of 180° is present, while at Point A, twice the audio voltage is present which, doubly amplified but without phase shift, is fed to Point B. At Point B, both voltages cancel.

An equivalent non-illustrated circuit variant is one wherein the characteristic impedance Z0 is connected to the points A and D, and the balancing impedance Z01 between Point A and ground.

Figure 4:
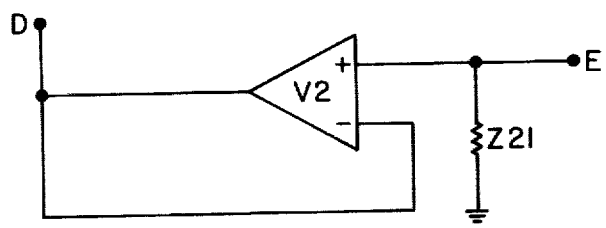
FIG. 4 is a circuit diagram of a voltage follower circuit.
Figure 3:
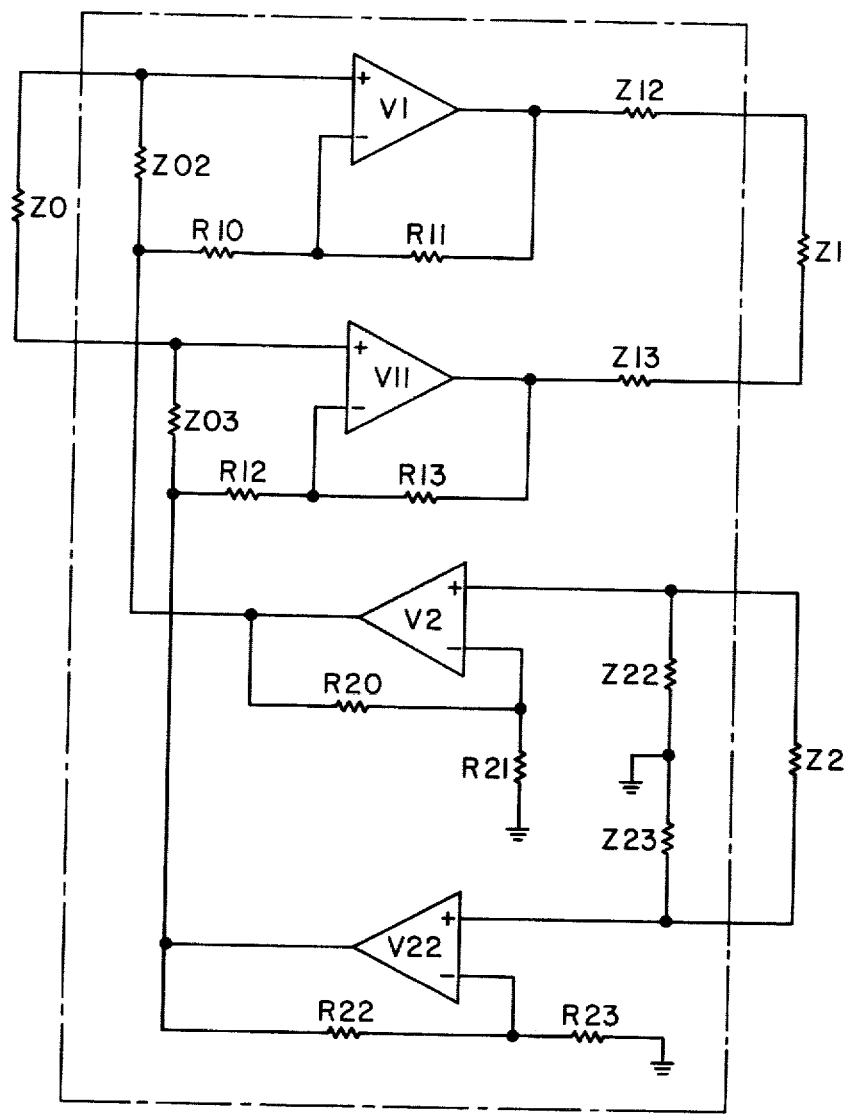
FIG. 3 is a circuit diagram of a symmetrical hybrid circuit constructed in accordance with the invention.

A symmetrical hybrid circuit is shown in FIG. 3. The circuit is composed of two asymmetrical hybrid circuit arrangements, wherein the resistances R10 to R13 of the first operational amplifiers V1 and V11 have equal values, the resistances of the resistors R20 to R23, associated with the incoming four-wire line and with the second operational amplifiers V2 and V22, having equal values also. The matching impedances Z12 and Z13 of the outgoing four-wire branch, as well as the matching impedances Z22 and Z23 of the incoming four-wire branch, are equal to each other and, with reference to the asymmetrical hybrid circuit arrangement: $Z12=Z13=0.5\times Z11$ and $Z22=Z23=0.5\times Z21$. Similarly, for the balancing impedances Z02 and Z03 at the input of the two-wire side: $Z02=Z03=0.5\times Z01$. The operation of this symmetrical hybrid circuit arrangement corresponds to the description given above of the asymmetrical hybrid circuit arrangement as shown in FIG. 2, the transmission losses in both directions being zero decibels. For the incoming direction i.e. from the four-wire side to the two-wire side, a given or specific attenuation is desired in the case of the asymmetrical as well as the symmetrical hybrid circuit arrangement. For this purpose, instead of the voltage amplifier shown in FIG. 1, a voltage follower as shown in FIG. 4 is connected to Points D and E. The same applies for the symmetrical hybrid circuit arrangement, in which the second operational amplifiers V2 and V22 with the resistors R20 to R23 thereof are replaced by two voltage follower circuits. Since the audio voltage is not amplified by the voltage followers, there is obtained at the input of the two-wire side (Z0 and Point A, respectively), a voltage lower by one-half than at the four-wire input (Z2 and Point E, respectively). An attenuation of six decibels is thereby attained.

There is claimed:

1. Hybrid circuit for a transition between two-wire and four-wire lines comprising an assembly of two monolithic integrated differential amplifiers serving as first and second operational amplifiers each having an inverted input and a non-inverted input and an output, a preceding voltage divider connected to each of the inverted inputs and respectively forming part of a feedback path for each of said operational amplifiers, bibirectional terminal means for connecting the two-wire side to the non-inverted input of said first amplifier and receive terminal means for connecting the four-wire side to the non-inverted input of said second amplifier, whereby audio voltage may be fed to said non-inverted inputs, the voltage dividers, respectively, having resistances of equal value to avoid a voltage gain, transmit terminal means for connecting the four-wire side to the output of said first amplifier, first and second matching impedances respectively connected to said receive terminal means and said transmit terminal means, a balancing impedance for the characteristic impedance of the two-wire side directly connected between the non-inverted input of said first amplifier and a common connection between said output of said second amplifier and the preceding voltage divider which is connected to the inverted input of the first amplifier, the magnitude of said matching impedances and the magnitude of the balancing impedance for the characteristic impedance of the two-wire side with respect to any given input impedances of the hybrid circuit being chosen so that, for an incoming transmission, half of the output voltage of said second amplifier is present at said non-inverted input of said first amplifier and, for an outgoing transmission, twice the input voltage to said first amplifier is present at said output thereof, so that transmission loss in the hybrid circuit is zero in both directions, said first amplifier being operable for effecting phase reversal of the voltage at the output of said second amplifier, the non-inverted input of said second amplifier having fed to it an a-c voltage fed to the hybrid circuit from the four-wire side so as to obtain a high isolation or attenuation for the hybrid circuit, said receive terminal means and said transmit terminal means, respectively, being connected through the respective first and second matching impedances to the non-inverted input of said second amplifier and to the output of said first amplifier, whereby an unbalanced hybrid circuit is formed.

2. A balanced hybrid circuit comprising, in combination, two unbalanced hybrid circuits each, in turn, comprising a hybrid circuit for a transition between two-wire and four-wire lines comprising an assembly of two monolithic integrated differential amplifiers serving as first and second operational amplifiers each having an inverted input and a non-inverted input and an output, a preceding voltage divider connected to each of the inverted inputs and respectively forming part of a feedback path for each of said operational amplifiers, bidirectional terminal means for connecting the two-wire side to the non-inverted input of said first amplifier and receive terminal means for connecting the four-wire side to the non-inverted input of said second amplifier, whereby audio voltage may be fed to said non-inverted inputs, the voltage dividers, respectively, having resistances of equal value to avoid a voltage gain, transmit terminal means for connecting the four-wire side to the output of said first amplifier, first and second matching impedances respectively connected to said receive terminal means and said transmit terminal means, a balancing impedance for the characteristic impedance of the two-wire side connected between the non-inverted input of said first amplifier and a common connection between said output of said second amplifier and the preceding voltage divider which is connected to the inverted input of the first amplifier, the magnitude of said matching impedances and the magnitude of the balancing impedance for the characteristic impedance of the two-wire side with respect to any given input impedances of the hybrid circuit being chosen so that, for an incoming transmission, half of the output voltage of said second amplifier is present at said non-inverted input of said first amplifier and, for an outgoing transmission, twice the input voltage to said first amplifier is present at said output thereof, so that transmission loss in the hybrid circuit is zero in both directions, said first amplifier being operable for effecting phase reversal of the voltage at the output of said second amplifier, the non-inverted input of said second amplifier having fed to it an a-c voltage fed to the hybrid circuit from the four-wire side so as to obtain a high isolation or attenuation for the hybrid circuit, said receive terminal means and said transmit terminal means, respectively, being connected through the respective first and second matching impedances to the non-inverted input of said second amplifier and to the output of said first amplifier, whereby an unbalanced hybrid circuit is formed, said unbalanced hybrid circuits being connected by the non-inverted inputs of said second amplifiers to the respective matching impedances thereof at the input of the four-wire side and by the outputs of said first amplifiers through the respective matching impedances there of at the output of the four-wire side, the balanced hybrid circuit having matching and balancing impedances with impedance values that are, respectively, one-half the impedance value of the corresponding impedances of one of said unbalanced hybrid circuits.

3. A balanced hybrid circuit comprising, in combination, two unbalanced hybrid circuits each, in turn, comprising a hybrid circuit for a transition between two-wire and four-wire lines comprising an assembly of two monolithic integrated differential amplifiers serving as first and second operational amplifiers each having an inverted input and a non-inverted input and an output, a preceding voltage divider connected to the inverted inputs forming part of a feedback path for said first operational amplifier, bidirectional terminal means for connecting the two-wire side to the non-inverted input of said first amplifier and receive terminal means for connecting the four-wire side to the non-inverted input of said second amplifier, whereby audio voltage may be fed to said non-inverted inputs, the voltage dividers, respectively, having resistances of equal value to avoid a voltage gain, transmit terminal means for connecting the four-wire side to the output of said first amplifier, first and second matching impedances respectively connected to said receive terminal means and said transmit terminal means, a balancing impedance for the characteristic impedance of the two-wire side connected between the non-inverted input of said first amplifier and a common connection between said output of said second amplifier and the preceding voltage divider which is connected to the inverted input of the first amplifier, the magnitude of said matching impedances and the magnitude of the balancing impedance for the characteristic impedance of the two-wire side with respect to any given input impedances of the hybrid circuit being chosen so that, for an incoming transmission, half of the output voltage of said second amplifier is present at said non-inverted input of said first amplifier and, for an outgoing transmission, twice the input voltage to said first amplifier is present at said output thereof, so that transmission loss in the hybrid circuit is zero in both directions, said first amplifier being operable for effecting phase reversal of the voltage at the output of said second amplifier, the non-inverted input of said second amplifier having fed to it an a-c voltage fed to the hybrid circuit from the four-wire side so as to obtain a high isolation or attenuation for the hybrid circuit, said receive terminal means and said transmit terminal means, respectively, being connected through the respective first and second matching impedances to the non-inverted input of said second amplifier and to the output of said first amplifier, whereby an unbalanced hybrid circuit is formed, said unbalanced hybrid circuits being connected by the non-inverted inputs of said second amplifiers to the respective matching impedances thereof at the input of the four-wire side and by the outputs of said first amplifiers through the respective matching impedances thereof at the output of the four-wire side, the balanced hybrid circuit having matching and balancing impedances with impedances values that are, respectively, one-half the impedance value of the corresponding impedances of one of said unbalanced hybrid circuits, said inverted inputs of said second operational amplifiers of said unbalanced hybrid circuits being directly connected to the outputs of said second operational amplifiers so as to attain a given attenuation of an audio voltage transmitted from the four-wire to the two-wire side.

* * * * *